United States Patent [19]

Lachmann et al.

[11] 3,843,729

[45] Oct. 22, 1974

[54] PROCESS FOR THE PRODUCTION OF 2,4-DIHYDROXY-BENZOPHENONE

[75] Inventors: Burkhard Lachmann; Hans Jurgen Rosenkranz, both of Krefeld, Germany

[73] Assignee: Bayer Aktiengesellschaft, Leverkusen, Germany

[22] Filed: Feb. 22, 1973

[21] Appl. No.: 334,848

[30] Foreign Application Priority Data
Feb. 25, 1972 Germany.......................... 2208970

[52] U.S. Cl. ........................................... 260/591
[51] Int. Cl. ........................................ C07c 49/82
[58] Field of Search ................................... 260/591

[56] References Cited
FOREIGN PATENTS OR APPLICATIONS
10,095   5/1891   Great Britain ...................... 260/59

*Primary Examiner*—Daniel D. Horwitz
*Attorney, Agent, or Firm*—Connolly and Hutz

[57] ABSTRACT

Object of the invention is a process for the production of 2,4 dihydroxybenzophenone by reacting resorcinol with benzo-trichloride in the presence of an organic solvent which is immiscible with water with the addition of a molar quantity from 1 to 5 times that of the benzotrichloride of a low molecular weight aliphatic alcohol.

4 Claims, No Drawings

PROCESS FOR THE PRODUCTION OF 2,4-DIHYDROXY-BENZOPHENONE

PROCESS FOR THE PRODUCTION OF 2,4-DIHYDROXY-BENZOPHENONE 2,4-dihydroxy-benzophenone is used as an ultraviolet absorber for protecting organic materials against the destructive action of short-wave radiation. 2-hydroxy-4-alkoxy-benzophenones, which are obtainable for example by alkylating 2,4-dihydroxy-benzophenone, are widely used as high-quality light stabilisers.

In the past, several processes have been developed for preparing 2,4-dihydroxy-benzophenone, but all these processes have various disadvantages.

One known conventional process is based on the acylation reaction between benzoyl chloride and resorcinol in the presence of aluminium chloride. A considerable expenditure for equipment is necessary when using this reaction, because of the violent decomposition of the Friedel-Crafts catalyst after the reaction has ended, especially with relatively large batches.

Another conventional process for preparing 2,4-dihydroxy benzophenone is the reaction of resorcinol with benzonitrile in the presence of zinc chloride as a catalyst. This process requires a long reaction time and preferably ether as the reaction medium. In addition, benzonitrile is a very toxic reagent.

The preparation of 2,4-dihydroxy-benzophenone by reaction benzotrichloride with resorcinol in water or in aqueous solvents is also known. For example, a process for preparing this compound in an aqueous medium has already been described in Ber. dtsch. chem. Ges 27, 1997,(1890), although in this process 2,4-dihydroxy-benzophenone is only obtained in a small yield in association with numerous coloured secondary products. Recently, this process has been varied by using a solvent mixture, consisting of water and a water-soluble organic solvent, as the reaction medium. This process forms the subject matter of the German Offenlegungsschriften No. 2,010,535 and No. 1,947,920.

One important disadvantage of these processes is that the water required as a component of the solvent forms benzoic acid with benzotrichloride under the given reaction conditions, and this acid firstly contaminates the 2,4-dihydroxy-benzophenone and secondly lowers the yield. Another disadvantage is that coloured secondary products are formed, which are found to be inconvenient. It is likewise a detrimental feature that the recovery of the organic component of the solvent is relatively complicated.

It has now surprisingly been found that 2,4-dihydroxy-benzophenone can be prepared in a simple manner and with a high yield from benzotrichloride and resorcinol, without the additional presence of water, in an organic solvent which is immiscible with water, by adding a low molecular weight aliphatic alcohol in a quantity specific for the reaction.

By this procedure, the following advantages are obtained:

1. Secondary products, such as, for example, benzoic acid, which are unavoidable with the conventional processes in aqueous solvents, do not occur.
2. The 2,4-dihydroxy-benzophenone is formed in an easily controllable one-stage reaction which proceeds under gentle conditions and, on cooling the reaction solution it crystallises out in pure form substantially free from coloured secondary products and, with a high yield.
3. The organic solvent may be used again for other batches, possibly even without being purified.
4. The 2,4-dihydroxy-benzophenone, isolated simply by vacuum filtration, can be used without purification for further reactions, whereby the production of 2-hydroxy-4-alkoxybenzophenones by a subsequent alkylation reaction is substantially simplified.

The invention concerns a process for the production of 2,4-dihydroxy-benzophenone in which resorcinol is reacted with benzotrichloride in an organic solvent which is immiscible with water, with the addition of a molar quantity from 1 to 5, preferably from 1.5 to 3, times that of the benzotrichloride, of a low molecular weight aliphatic alcohol.

The molar ratio between benzotrichloride and resorcinol can be varied in a range from 1:9 to 9:1. It is however advantageous to react 1 mol of resorcinol with from 1 to 1.5 moles of benzotrichloride. The low molecular weight aliphatic alcohol which is required as the third reaction component is added in a quantity of from 1 to 5 moles, preferably from 1.5 to 3 moles, per mole of benzotrichloride.

Low molecular weight aliphatic alcohols suitable for the reaction according to the invention are those which consist of up to 6 carbon atoms, they can be branched or straight-chain and can have a primary, secondary or tertiary OH group. Alcohols according to the invention which are preferred are methanol and ethanol. The alcohols can be added alone or in mixtures.

The use of an organic solvent which is immiscible with water is one essential feature of the invention. To be mentioned as examples of these solvents, although this list is not claimed to be complete are:

Acyclic hydrocarbons with from 5 to 12 carbon atoms, for example, n-pentane, n-hexane, n-heptane, n-octane, n-nonane, n-decane, n-undecane, n-dodecane, 2-methyl-heptane, 2-methylhexane, 3-methylhexane, 2,3-dimethylhexane and others; cyclic hydrocarbons with from 5 to 10 carbon atoms, for example cyclopentane, cyclohexane, cycloheptane, decalin, 1,3-dimethylcyclohexane, 1,4-dimethylcyclohexane; halogenated hydrocarbons with up to 8 carbon atoms, for example carbon tetrachloride, chloroform, methylenechloride, 1,2-dichlorethane, 1-chloropropane, 1-chlorobutane, 1-chloropentane, trichlorethylene, tetrachlorethane, n-octylchloride, 1,2-dibromethane, n-hexyl- chloride;

aromatic hydrocarbons, which may optionally be substituted in one or more positions with alkyl groups with up to 4 carbon atoms, nitro groups or halogen groups, for example benzene, toluene, chlorobenzene, dichlorobenzene, xylene, tetralin, nitrobenzene, ethylbenzene, isopropylbenzene; and also alkyl acetates and alkyl propionates with alkyl groups with up to 5 carbon atoms, for example methyl, ethyl, propyl and butyl acetates and propionates.

Chloroform, benzene and toluene are particularly preferred solvents.

The solvents can be used alone or in admixture. Generally, a quantity of solvent is used which amounts to from 1 to 10 parts by weight per part by weight of benzotrichloride.

The reaction temperature can be in the range from 30°C to 150°C. In one preferred embodiment, it is at or somewhat below the boiling point of the added alcohol, e.g. at 60° to 65°C when adding methanol and 70° to 80°C when adding ethanol.

The way in which the reactants are combined is not critical. Generally, however, one or two reactants are added to the other component or components at elevated temperature over a certain time period.

The product which is obtained according to the invention can be easily alkylated without any intermediate purification. In this way 2-hydroxy-4-alkoxy-benzophenones could be obtained.

The alation reaction is carried out by procedures which are generally known. Alkyl halides and dialkyl-sulphates can serve as alkylation agents. When using alkyl chlorides, catalytic quantities of an alkali metal iodide are added to improve the yield.

Aliphatic or alicyclic ketones with up to 7 carbon atoms can serve as solvent. A preferred solvent is cyclohexanone.

The reaction temperature is generally in the range from 50°C to 160°C. The alkali used in the reaction is an alkali metal carbonate or an alkali metal hydrogen carbonate.

Generally, one equivalent of 2,4-dihydroxy-benzophenone is reacted with from 1.0 to 1.3 equivalents of the alkylating agent and from 1.0 to 1.5 equivalents of the acid-combining alkali. The yields are from 75 to 85 percent of the theoretical. The reaction time is generally in the range from 2 to 7 hours.

The following examples serve to further explain the invention, without these examples imposing any limitation on the invention.

Example 1

To a solution of 20 g of benzotrichloride in 40 cc of benzene was added dropwise for 1 hour at reflux temperature a solution of 11 g of resorcinol and 9.5 g of ethanol in 13 cc of benzene. The stirring was continued for 1½ hours. Finally, only a slight evolution of HCl was still found. Filtering was carried out while warm. On cooling the filtrate, crystallisation took place. By adding cyclohexane to the mother liquor, more product was obtained.

Yield: 15.7 g = 73 percent of the theoretical, yellow crystals, MP 141° to 144°C.

Example 2

To a solution of 20 g of benzotrichloride in 90 cc of chloroform was added dropwise within 40 minutes a solution of 11 g of resorcinol, 5 g of methanol and 10 cc of chloroform, at the boiling point of the chloroform. After stirring for 3 hours during which 50 cc of cyclohexane were added the solution was cooled. The precipitated 2,4-dihydroxy-benzophenone (19.5 g) was obtained in a yield of 91 percent. Yellow crystals, M.P. 137° to 143°C.

Example 3

500 g of benzotrichloride and 1.8 litres of toluene were placed in a stirrer-type apparatus. After heating up to 60° to 65°C, a solution of 220 g of resorcinol, 140 g of methanol and 200 cc of toluene was added dropwise over 1 hour. After further stirring for 6 hours at 60° to 65°C and subsequent cooling to room temperature, the precipitated 2,4-dihydroxy-benzophenone was filtered with suction. Yield: 385 g = 90 percent of the theoretical; yellow crystals, M.P. 140° to 144°C.

Example 4

1 litre of cyclohexanone was placed in a stirrer-type apparatus with a reflux condenser. 107 g of the crude 2,4-dihyroxybenzophenone prepared according to Example 3, 100 g of n-octylbromide and 60 g of potassium hydrogen carbonate were successively added. After a reaction lasting 5 hours under reflux conditions, the product was vacuum-filtered from the undissolved material and the solvent was distilled off under vacuum. The residue was recrystallised from 600 cc of ethanol.

Yield: 133 g (= 81 percent of the theoretical), yellow crystals, M.P. 48° to 50°C.

Example 5

500 cc of cyclohexanone were placed in a stirrer-type apparatus. 64 g the 2,4-dihydroxy-benzophenone prepared according to Example 3, 49 g of n-octylchloride, 36 g of potassium hydrogen carbonate and 4 g of potassium iodide were successively added. After a reaction lasting 5 hours under reflux conditions, the product was filtered off with suction from the undissolved material and the solvent was distilled off under vacuum. The residue was recrystallised from 200 cc of methanol. Yield: 80 g (81 percent of the theoretical), yellow crystals, M.P. 48° to 50°C.

Example 6

64.5 g of the 2,4-dihydroxy-benzophenone, prepared according to Example 3 were dissolved in 300 cc of cyclohexane. After adding 45 g of potassium carbonate, 39 g of dimethyl sulphate were added dropwise within 45 minutes to the reaction solution heated to 80° to 90°C. Stirring was continued for another 4 hours at 90° to 100°C. The product was filtered off with suction from the undissolved material, the solvent was distilled off under vacuum and the residue was distilled under vacuum. Yield: 53 g (= 77 percent of the theoretical), yellow crystals M.P. 61° to 63°C.

What we claim is:

1. In the process of producing 2,4-dihydroxy-benzophenone by reacting resorcinol with benzotrichloride, the improvement which comprises carrying out said reaction in an organic solvent which is immiscible with water and in the presence of from 1 to 5 mols of a low molecular weight aliphatic alcohol per mol of benzotrichloride, said organic solvent being employed in an amount of from 1 to 10 parts by weight per part by weight of benzotrichloride and being selected from the group consisting of acyclic hydrocarbons having from 5 to 12 carbon atoms; cyclic hydrocarbons having from 5 to 10 carbon atoms; aromatic hydrocarbons; aromatic hydrocarbons substituted with at least one member selected from the group consisting of alkyl having up to 4 carbon atoms, nitro and halogen; halogenated acyclic hydrocarbons having up to 8 carbon atoms; alkyl acetates having up to 5 carbon atoms in the alkyl moiety and alkyl propionates having up to 5 carbon atoms in the alkyl moiety.

2. The process as claimed in claim 1 in which the low molecular weight aliphatic alcohol contains from 1 to 6 carbon atoms.

3. The process as claimed in claim 1 in which methanal or ethanol is the low molecular weight aliphatic alcohol.

4. The process as claimed in claim 1 in which the low molecular weight aliphatic alcohol is added in the relative proportion of from 1.5 to 3 moles per mole of benzotrichloride.

* * * * *